(12) United States Patent
Bruschi et al.

(10) Patent No.: US 8,734,054 B2
(45) Date of Patent: May 27, 2014

(54) GUIDE DEVICE FOR SUPPORTING AN UNDERWATER PIPELINE, LAYING RAMP COMPRISING SUCH A GUIDE DEVICE, LAYING VESSEL EQUIPPED WITH SUCH A LAYING RAMP, AND METHOD OF CONTROLLING AN UNDERWATER-PIPELINE LAYING RAMP

(75) Inventors: Roberto Bruschi, Falconara Marittima (IT); Teresio Signaroldi, Sordio (IT)

(73) Assignee: Saipem S.p.A., San Donato Milanese (IT)

( * ) Notice: Subject to any disclaimer, the term of this patent is extended or adjusted under 35 U.S.C. 154(b) by 364 days.

(21) Appl. No.: 12/866,342

(22) PCT Filed: Feb. 6, 2009

(86) PCT No.: PCT/IB2009/000216
§ 371 (c)(1),
(2), (4) Date: Nov. 12, 2010

(87) PCT Pub. No.: WO2009/098586
PCT Pub. Date: Aug. 13, 2009

(65) Prior Publication Data
US 2011/0052324 A1    Mar. 3, 2011

(30) Foreign Application Priority Data
Feb. 8, 2008 (IT) .............................. MI2008A0205

(51) Int. Cl.
*F16L 1/12* (2006.01)
*F16L 1/18* (2006.01)
*F16L 1/235* (2006.01)

(52) U.S. Cl.
CPC .. *F16L 1/18* (2013.01); *F16L 1/235* (2013.01)
USPC .......................................................... 405/166

(58) Field of Classification Search
USPC ........... 405/166, 167, 168.1, 168.4, 169, 170; 114/312, 315
See application file for complete search history.

(56) References Cited

U.S. PATENT DOCUMENTS

| 3,436,895 A | * | 4/1969 | Pearne et al. .................... 53/214 |
| 3,487,648 A | * | 1/1970 | Lawrence ....................... 405/166 |
| 3,775,985 A | * | 12/1973 | Shaw ............................. 405/166 |
| 3,860,122 A | * | 1/1975 | Cernosek ....................... 414/732 |

(Continued)

FOREIGN PATENT DOCUMENTS

| EP | 1 063 163 B1 | 12/2000 |
| WO | WO 96/08605 | 3/1996 |
| WO | WO 00/05525 | 2/2000 |

OTHER PUBLICATIONS

International Search Report and Written Opinion PCT/IB2009/000216, mailed Sep. 10, 2009.

*Primary Examiner* — Frederick L Lagman
*Assistant Examiner* — Patrick Lambe
(74) *Attorney, Agent, or Firm* — Winston & Strawn LLP (57) ABSTRACT

A guide device for supporting an underwater pipeline along a feed path as it is being laid. The device is fitted to a laying ramp and has a cradle housing the pipeline; a frame fixed to the laying ramp; and a spacer mechanism located between the frame and the cradle to selectively adjust the distance between the cradle and frame. The device further includes a shock absorber connected to the cradle. The invention includes a method for using the device.

28 Claims, 6 Drawing Sheets

(56) References Cited

U.S. PATENT DOCUMENTS

| | | | |
|---|---|---|---|
| 4,030,311 A * | 6/1977 | Rafferty | 405/166 |
| 4,150,911 A * | 4/1979 | Droste et al. | 405/177 |
| 4,257,718 A * | 3/1981 | Rosa et al. | 405/167 |
| 4,472,079 A * | 9/1984 | Langner | 405/167 |
| 4,521,132 A * | 6/1985 | Isakson et al. | 405/166 |
| 4,755,947 A * | 7/1988 | Braschler et al. | 701/116 |
| 4,961,671 A * | 10/1990 | Recalde | 405/168.3 |
| 4,984,934 A * | 1/1991 | Recalde | 405/168.3 |
| 5,011,333 A * | 4/1991 | Lanan | 405/166 |
| 5,413,434 A * | 5/1995 | Stenfert et al. | 405/166 |
| 5,527,134 A * | 6/1996 | Recalde | 405/168.3 |
| 5,533,834 A * | 7/1996 | Recalde | 405/168.3 |
| 5,580,187 A * | 12/1996 | Jordan | 405/166 |
| 5,823,712 A * | 10/1998 | Kalkman et al. | 405/165 |
| 5,893,682 A * | 4/1999 | Oliveri | 405/166 |
| 6,328,502 B1 * | 12/2001 | Hickey et al. | 405/168.3 |
| 6,524,030 B1 * | 2/2003 | Giovannini et al. | 405/166 |
| 6,685,393 B1 * | 2/2004 | Critsinelis et al. | 405/166 |
| 7,909,538 B2 * | 3/2011 | Willis et al. | 405/168.4 |
| 2011/0081204 A1 * | 4/2011 | van Grieken et al. | 405/167 |

* cited by examiner

GUIDE DEVICE FOR SUPPORTING AN UNDERWATER PIPELINE, LAYING RAMP COMPRISING SUCH A GUIDE DEVICE, LAYING VESSEL EQUIPPED WITH SUCH A LAYING RAMP, AND METHOD OF CONTROLLING AN UNDERWATER-PIPELINE LAYING RAMP

This application is a 371 filing of International Patent Application PCT/IB2009/000216 filed Feb. 6, 2009.

TECHNICAL FIELD

The present invention relates to a guide device for supporting an underwater pipeline.

More specifically, the present invention relates to a guide device for supporting an underwater pipeline along a feed path of the pipeline as it is being laid.

BACKGROUND ART

In the following description, the term "underwater pipeline" is intended to mean a pipeline laid on the sea bed. Though specific reference is sometimes made in the description to laying underwater pipelines in the sea, it is understood that the object of the present invention applies to any stretch of water large and deep enough to employ laying vessels, and is in no way limited to marine applications.

A known guide device, such as the one described in document U.S. Pat. No. 4,030,311, is fitted to a laying ramp, and comprises a cradle housing the pipeline; a frame fixed to the laying ramp; and a spacer mechanism located between the first frame and the cradle to selectively adjust the distance between the cradle and the frame.

In document U.S. Pat. No. 4,030,311, the spacer mechanism comprises a double-acting hydraulic cylinder; and an arm hinged to the frame and connected to the hydraulic cylinder.

The cradle is hinged to the arm by a double hinge to swing freely about an axis crosswise to the feed path, and about a further axis perpendicular to said axis and to the feed path.

The guide device in U.S. Pat. No. 4,030,311 has the advantage of enabling fast adjustment of the distance between the frame and cradle, and enabling the cradle to adjust automatically to the position of the pipeline at the cradle.

On the other hand, the guide device in U.S. Pat. No. 4,030,311 fails to prevent the pipeline from transmitting severe stress to and possibly impairing operation of the guide device, and vice versa, fails to prevent the guide device from transmitting severe stress to and so causing structural damage to the pipeline just as it is being laid.

Moreover, from the construction standpoint, some parts of the guide device, subjected to and therefore designed to withstand particularly severe stress, are extremely bulky and heavy, thus resulting in an extremely heavy laying ramp that is difficult to manoeuvre.

For a clearer understanding of the problems involved, it is important to bear in mind that the guide device is fitted to a laying ramp, in turn installed on a laying vessel.

A laying vessel is a floating unit comprising a pipeline assembly line or so-called "firing line", and equipped at the stern with the laying ramp, which defines an extension of the firing line and serves to ease the pipeline onto the sea bed as the floating unit advances.

The method of producing and laying the pipeline comprises assembling the pipeline on a substantially horizontal firing line; and laying the pipeline using the laying ramp, which, in a work configuration, guides and supports the pipeline along an arc-shaped path partly above and partly below sea level. Using this method, the pipeline being laid assumes an "S" shape between the vessel and sea bed, with curves whose radius of curvature depends on the rigidity of the pipeline, and various types of vessels can be employed, such as pontoons, barges, semisubmersible and single-hull vessels. Pontoons and barges are the underwater-pipeline laying vessels most commonly used in the past; semisubmersible vessels are particularly suitable for laying underwater pipelines in bad weather (rough sea); and single-hull vessels have the advantage of being fast, have ample pipe storage space, and can accommodate relatively long firing lines with a high output rate.

Laying underwater pipelines, however, calls for relatively good weather conditions, so much so that, in rough-sea conditions, laying is suspended: the completed part of the pipeline is left on the sea bed and attached to a winch cable for retrieval later; and the laying ramp is set as high as possible above sea level in a so-called "survival configuration".

The laying ramp normally comprises an inner ramp hinged to the vessel, and an outer ramp hinged to the inner ramp, and can assume various work configurations, depending on the depth of the sea bed and the characteristics of the pipeline; an in-transit configuration, in which the inner and outer ramps allow unobstructed movement of the vessel; and said "survival configuration". Accordingly, the laying ramp is connected to the vessel by an actuating assembly as described, for example, in the Applicant's U.S. Pat. No. 4,257,718.

To guide and feed the pipeline forward, the laying ramp is equipped with a number of guide devices aligned to define the feed path of the pipeline.

In connection with the above, it should be pointed out that the vessel and the pipeline are subjected to stress by the sea during the laying operation. On the one hand, the vessel, though maintained in position and jogged along a given course by a system of mooring lines or by so-called dynamic positioning using thrusters, is still subject to undesired movements caused by waves and sea currents.

On the other hand, the pipeline is also subjected to the same waves and currents. But, because of the difference in the shape and mass of the vessel and the pipeline, and the fact that the pipeline is substantially flexible and rests partly on the sea bed, the waves and sea currents produce additional stress between the laying ramp and pipeline.

This stress may result in severe loads being transmitted between the guide devices and the pipeline, and may impair the structural integrity of the guide devices, of the laying ramp as a whole, and of the pipeline.

To eliminate this drawback, Patent Application WO 96/08605 describes a guide device of the above type comprising two cradles hinged to an intermediate frame, in turn connected to a further intermediate frame by a number of air springs.

Over the years, this guide device has proved particularly effective in safeguarding the structure of the device itself. However, known guide devices still call for a good deal of maintenance, on account of the wear to which the components are subject.

DISCLOSURE OF INVENTION

One object of the present invention is to provide a guide device for supporting an underwater pipeline as it is being laid, and designed to minimize the drawbacks of the known art.

Another object of the present invention is to provide a guide device for supporting an underwater pipeline as it is being laid, and which is structured to reduce stress on the component parts of the guide device.

According to the present invention, there is provided a guide device for supporting an underwater pipeline along a feed path as it is being laid, the guide device being fitted to a laying ramp, and comprising a cradle housing the pipeline; a first frame fixed to the laying ramp; and a spacer mechanism located between the first frame and the cradle to selectively adjust the distance between the cradle and the first frame; the guide device being characterized in that the spacer mechanism comprises at least one shock absorber connected to the cradle.

A major advantage of the present invention lies in all the guide device components, except for the cradle, being protected against severe stress and shock by the shock absorber connected directly to the cradle. Reducing the amount of shock thus provides for safeguarding the most sensitive components.

The present invention also relates to a laying ramp.

According to the present invention, there is provided an underwater-pipeline laying ramp; the laying ramp being hinged to a laying vessel to assume a number of work configurations, and comprising a supporting structure along which are aligned guide devices. Each guide device is fitted to the laying ramp and comprises a cradle to house a pipeline; a first frame fixed to the laying ramp; and a spacer mechanism located between the first frame and the cradle to selectively adjust the distance between the cradle and the first frame. The laving ramp further comprises a number of uprights arranged in pairs of opposite uprights the first frame of each guide device being connected to the opposite uprights in a respective pair.

The spacer mechanism comprises at least one shock absorber connected to the cradle, a second frame rotatably connected to the first frame, and a rocker arm connected in rotary manner to the second frame. The spacer mechanism further comprises an actuator wherein the second frame rotates about an axis crosswise to the feed path and the actuator is hinged to the rocker arm and to the second frame.

The cradle is hinged to the second frame by connecting rods, thereby forming an articulated quadrilateral with the second frame and the connecting rods, with the shock absorber being hinged to both the rocker arm and the cradle. The shock absorber may also be a hydraulic actuator of variable stiffness.

The guide device may further comprise: a first frame having at least a first shaft aligned with the abovementioned axis crosswise to the feed path and a second frame comprising at least a first bush fitted to the first shaft, so as to enable the cradle to swing about and slide across said axis; at least one actuator assembly extending between the first frame and the spacer mechanism to position the cradle and/or second frame centrally along said axis with respect to the first frame; and/or two actuator assemblies located on opposite sides of the second frame, wherein each actuator assembly extends between the first frame and the second frame to position the second frame centrally along said axis with respect to the first frame.

The actuator assemblies located on opposite sides of the second frame may each further comprise a second bush movable along the first shaft and a second actuator to push the second bush along the first shaft against the first bush. In this configuration, each actuator assembly may also comprise an arm hinged to the first frame and to the second bush, with the first actuator hinged to both the first frame and the arm.

In any of the aforementioned guide device configurations, the device may further include two cable guide pulleys connected to two opposite faces of the cradle along the feed path. Each cable guide pulley is fitted to the cradle by an articulating mechanism comprising a third actuator for moving the cable guide pulley selectively between a work position and a rest position.

The present invention also relates to a laying vessel.

According to the present invention, there is provided an underwater-pipeline laying vessel, the laying vessel comprising a firing line for constructing underwater pipelines; an underwater-pipeline laying ramp as described above; a laying ramp actuating assembly for setting the laying ramp to a number of work configurations; and a control device for controlling the distance between each cradle and the respective first frame as a function of a matrix of optimum values. In this configuration, the laying ramp may further include a first frame connected in a sliding manner to a respective pair of uprights. The first frame may also be fixable in a number of given positions along its respective uprights, which may be accomplished by the inclusion of fastening means capable of engaging holes in the first frame and in the uprights.

The present invention also relates to a method of controlling a laying ramp.

According to the present invention, there is provided a method of controlling a laying ramp for feeding an underwater pipeline along a feed path, the laying ramp being hinged to a laying vessel to assume a number of work configurations, and comprising a supporting structure along which are aligned guide devices, each comprising a cradle housing the pipeline; a first frame fixed to the laying ramp; and a spacer mechanism located between the first frame and the cradle; the method comprising selectively adjusting, for each guide device, the distance between the cradle and the respective first frame; and the method being characterized by selectively adjusting, for each guide device, the distance between the cradle and the respective first frame as a function of a matrix of optimum values.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

The Laying Vessel

Figure 1:
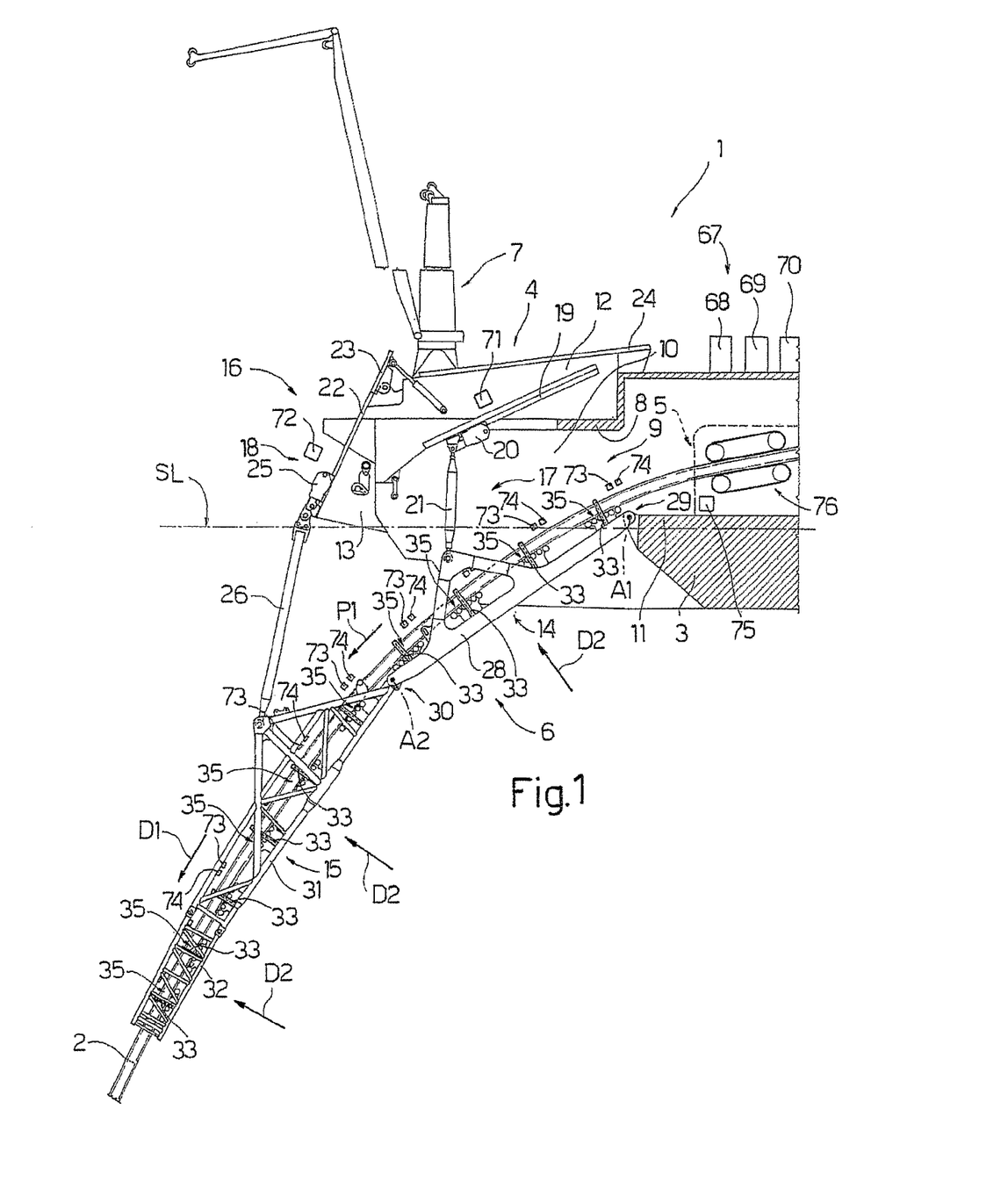
FIG. 1 shows a partly sectioned side view, with parts removed for clarity, of a laying vessel equipped with an underwater-pipeline laying ramp in accordance with the present invention.

Number 1 in FIG. 1 indicates a vessel for laying an underwater pipeline 2 in relatively deep water, the level of which is indicated SL. In the example shown, vessel 1 is a single-hull ship having a hull 3; an aftercastle 4; and a firing line 5 for constructing pipeline 2 by joining pipes not shown in the drawings.

Vessel 1 is equipped with a laying ramp 6 which, in the FIG. 1 work configuration, defines an extension of firing line 5.

Laying ramp 6 serves to guide and support pipeline 2 along a feed path P1 having at least one curved portion, a first portion above sea level SL, and a second portion below sea level SL.

Vessel 1 is equipped with a crane 7 set up, and for performing auxiliary operations, in the area of aftercastle 4.

Aftercastle 4 of vessel 1 has an upper deck 8 defining the top of a well 9, which is bounded laterally by two walls 10 (only one shown in FIG. 1) partly immersed at the aft end, and is bounded partly at the bottom by a lower deck 11 supporting firing line 5.

Above upper deck 8, aftercastle 4 comprises two lateral walls 12 (only one shown in FIG. 1), and two opposite, substantially vertical walls 13 (only one shown in FIG. 1) at the aft end.

Laying ramp 6 is housed at least partly in well 9, is hinged to vessel 1, and, in the example shown, comprises an inner ramp 14 hinged to vessel 1 and, in the example shown, to lower deck 11; and an outer ramp 15 hinged, in FIG. 1, to inner ramp 14. Vessel 1 comprises an actuating assembly 16 for setting laying ramp 6 to a number of work configurations (only one shown in FIG. 1); an in-transit configuration (not shown) in which inner ramp 14 and outer ramp 15 are both above sea level SL; and a survival configuration (not shown in FIG. 1) in which inner ramp 14 and outer ramp 15 are locked as high as possible above sea level SL. Actuating assembly 16 comprises an actuating device 17 connected to inner ramp 14 and vessel 1; and an actuating device 18 connected to outer ramp 15 and vessel 1.

Actuating devices 17 and 18 serve to support, control and set inner ramp 14 and outer ramp 15 respectively to the above configurations.

In the FIG. 1 laying work configuration, inner ramp 14 and outer ramp 15 define respective supports for pipeline 2.

Actuating device 17 comprises two rails 19; two powered carriages 20 (jacking system) movable along rails 19; and two rods 21 hinged to inner ramp 14 and to respective powered carriages 20. FIG. 1 shows only one rail 19, one powered carriage 20, and one rod 21.

Actuating device 18 comprises three pairs of rails 22, 23, 24; two powered carriages 25 (jacking system) movable along rails 22, 23, 24; and two rods 26 hinged to outer ramp 15 and to respective powered carriages 25. Rail 23 can be swung selectively into line with rail 22 and rail 24, so rails 22, 23, 24 define a very long path and are much more compact than a single straight rail equal in length to the sum of rails 22, 23, 24.

FIG. 1 only shows one rail 22, one rail 23, one rail 25, one powered carriage 25, and one rod 26.

Vessel 1 is jogged along a given course, and the movement of vessel 1 with respect to pipeline 2 eases pipeline 2 off vessel 1.

The Laying Ramp

More specifically, and with reference to FIG. 1, inner ramp 14 comprises a substantially rigid trestle box structure 28, which has a first end hinged to lower deck 11 by a hinge 29 with an axis A1 substantially parallel to sea level (in calm-sea conditions); and a second end hinged to outer ramp 15 by a hinge 30 with an axis A2 parallel to axis A1. In the FIG. 1 example, outer ramp 15 comprises two substantially rigid tubular trestle structures 31 and 32, which are connected rigidly to one another and connectable to inner ramp 14 by hinge 30.

In addition to the work configurations described above, laying ramp 6 also assumes work configurations in which outer ramp 15 has no structure 32, which is basically an extension of structure 31. Laying ramp 6 also assumes work configurations in which outer ramp 15 is disconnected from inner ramp 14 and temporarily set to a rest position, possibly on board vessel 1. In the latter configurations, pipeline 2 is laid solely by inner ramp 14.

Figures 2, 3:
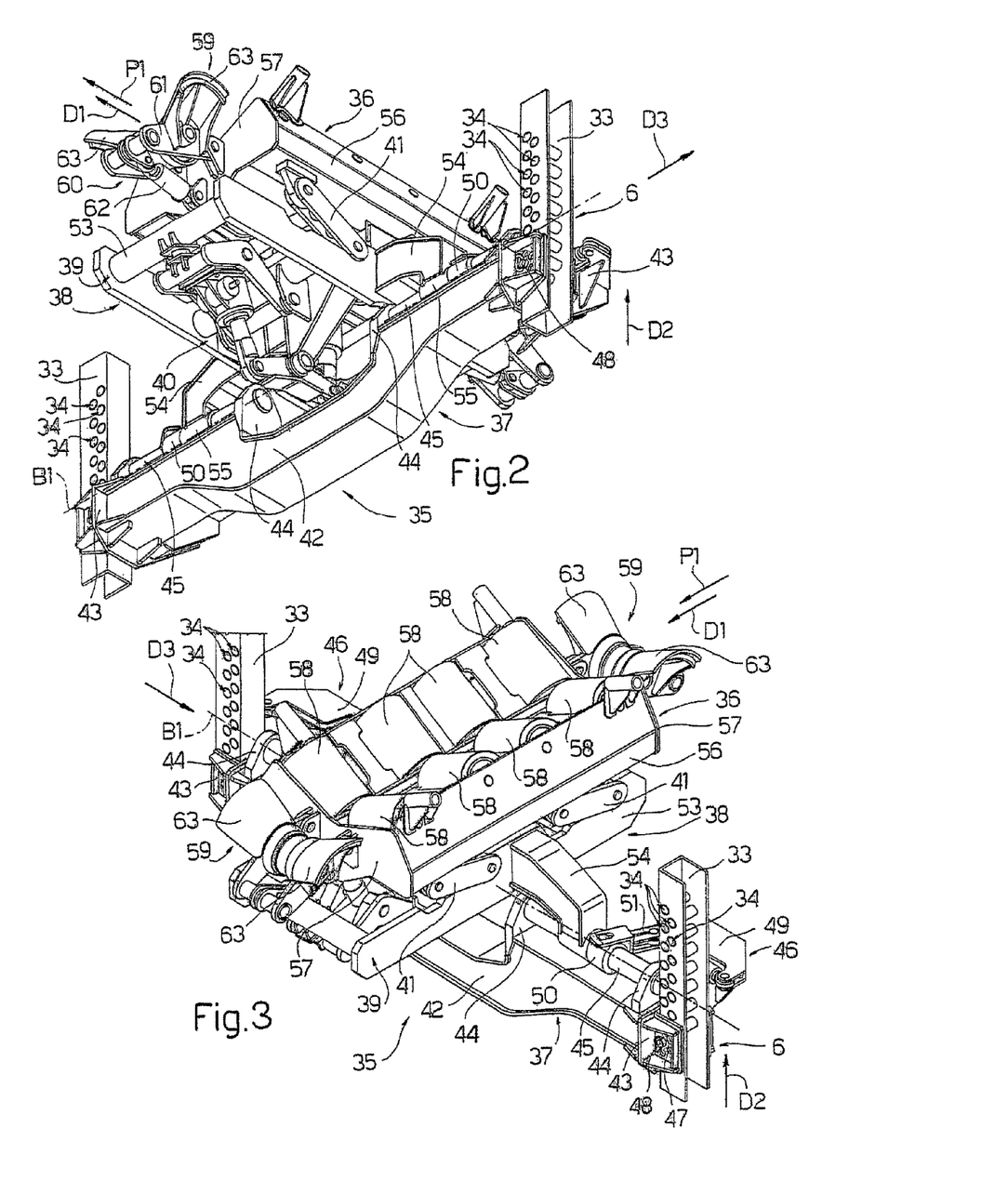
FIGS. 2 and 3 show larger-scale, partly sectioned views in perspective, with parts removed for clarity, of a guide device in accordance with the present invention.

Inner ramp 14 and outer ramp 15 comprise a number of pairs of uprights 33 which, as shown in FIGS. 2 and 3, are positioned facing and have a number of holes 34; and guide devices 35 for supporting pipeline 2. Guide devices 35 are aligned with one another to define feed path P1 and the curvature of pipeline 2 at laying ramp 6.

The Guide Device

Guide device 35 serves to guide and support pipeline 2 along feed path P1 as pipeline 2 is being laid, and, with reference to FIGS. 2 and 3, comprises a cradle 36 housing pipeline 2 (not shown in FIGS. 2 and 3); a frame 37 fixed to laying ramp 6—in the example shown, to uprights 33; and a spacer mechanism 38 located between frame 37 and cradle 36 to selectively adjust the distance between cradle 36 and frame 37.

Cradle 36 extends substantially in a direction D1, and to a small extent defines part of feed path P1 of pipeline 2.

Uprights 33 extend in a direction D2, and frame 37, spacer mechanism 38, and cradle 36 are arranged successively in direction D2 which is perpendicular to direction D1.

Cradle 36 is movable, with respect to frame 37 and laying ramp 6, along an axis B1 in a direction D3 crosswise to feed path P1 and to directions D1 and D2, so as to permit lateral movement of cradle 36 with respect to frame 37 and laying ramp 6.

Spacer mechanism 38 comprises a frame 39; and an actuator assembly 40 (not shown in FIG. 3). Frame 39 is connected to frame 37 to swing about axis B1 and move along axis B1, and is connected to cradle 36 by connecting rods 41 which, together with cradle 36 and frame 39, define, in projection, an articulated quadrilateral, as shown more clearly in FIG. 8. In the example shown, connecting rods 41 are four in number and hinged to frame 39 and to cradle 36 about respective axes parallel to axis B1.

Frame 37 comprises a cross beam 42; two brackets 43 fixed to opposite ends of cross beam 42; four flanges 44 aligned along cross beam 42; two aligned shafts 45 of axis B1; and two actuator assemblies 46 supported by respective brackets 43.

Cross beam 42 has a central portion offset with respect to two lateral portions, at which shafts 45 extend.

Each shaft 45 is supported by a respective pair of flanges 44, and is spaced apart from the other shaft 45.

Brackets 43 can be fitted to respective uprights 33 and, more specifically, have holes 47 which, together with holes 34, are engaged by bolts 48 or other fasteners, so that each guide device 35 is fixed in a given position with respect to uprights 33 and, in particular, with respect to laying ramp 6 in direction D2. This adjustment to the position of guide device 35 is a rough preliminary adjustment made, prior to the actual laying operation, on the basis of the preferred work configuration of laying lamp 6 to be adopted for the laying operation.

The preliminary position of guide devices 35 with respect to uprights 33 is chosen by calculating the best curve of pipeline 2 along laying ramp 6 for a given configuration of laying ramp 6.

Figure 5:
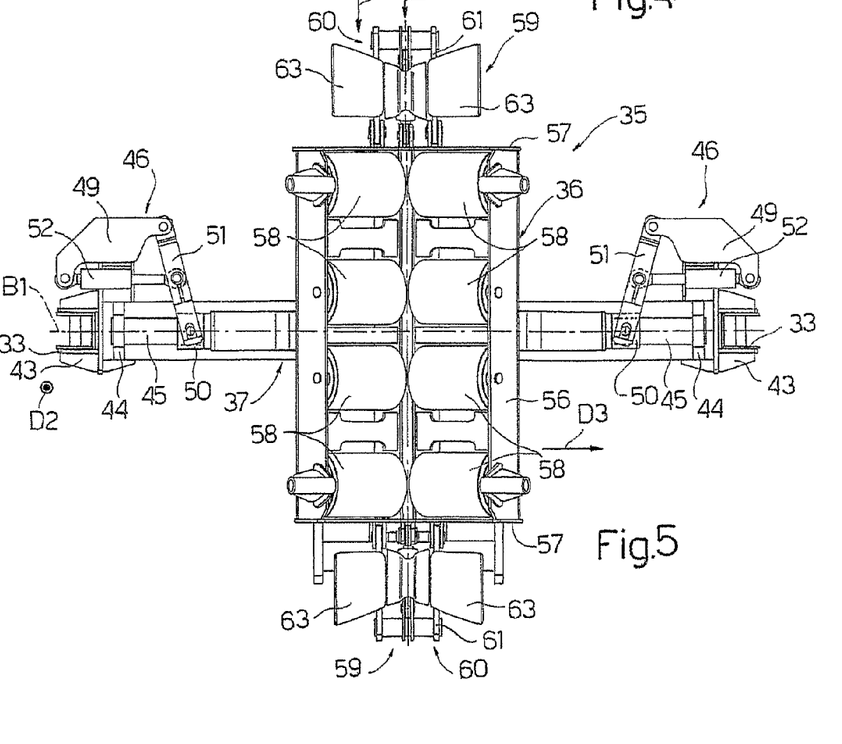
FIG. 5 shows a plan view, with parts removed for clarity, of the FIGS. 2 and 3 guide device.
Figure 6:
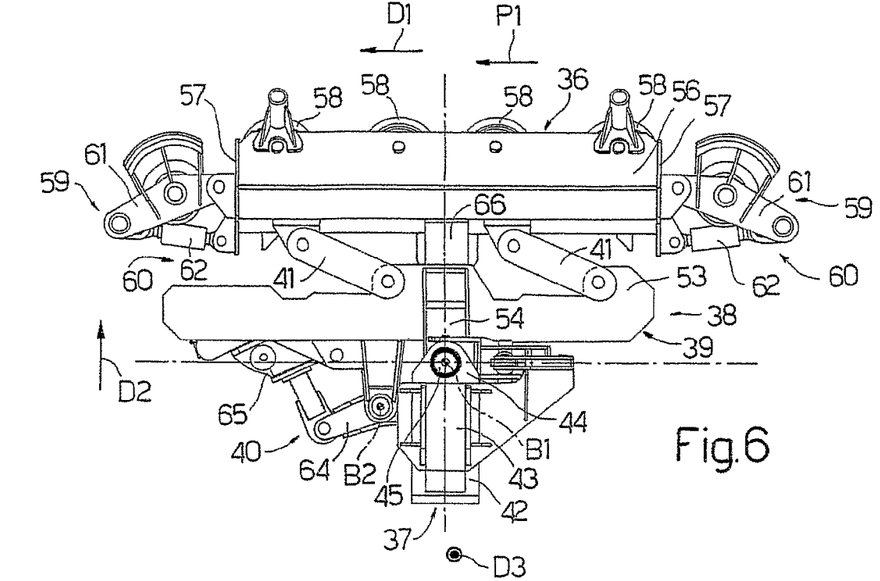
FIGS. 6 and 7 show side views, with parts removed for clarity, of the FIG. 2 guide device in two different work positions.
Figure 7:
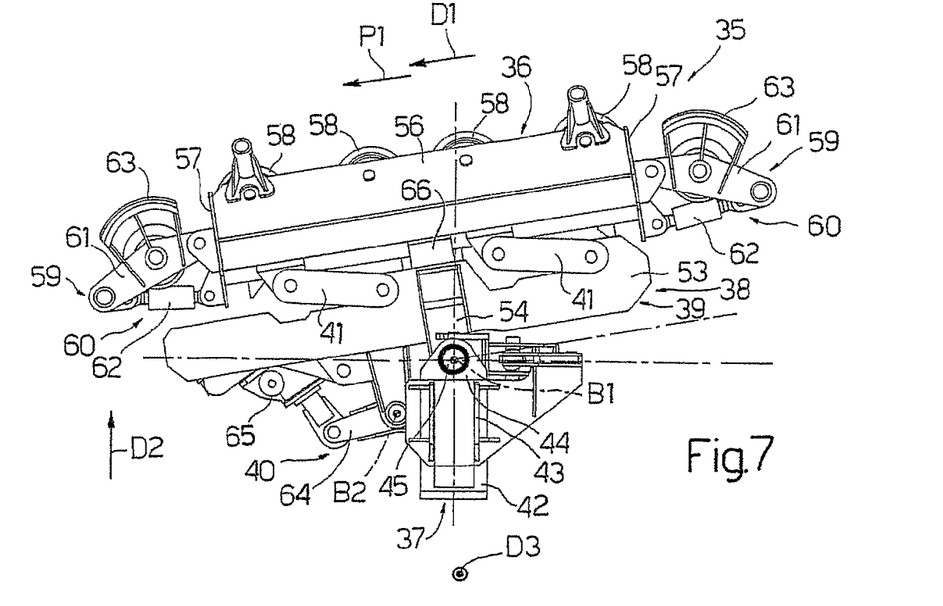

With reference to FIG. 5, each actuator assembly 46 comprises a flange 49 integral with a bracket 43; a bush 50 mounted to slide with respect to a respective shaft 45 along axis B1; an arm 51 hinged to flange 49 and bush 50; and an actuator 52, in particular a double-acting hydraulic cylinder, hinged to flange 49 and arm 51. Each actuator assembly 46 serves to push cradle 36 parallel to axis B1 with respect to frame 37 and laying ramp 6, as described in detail below.

Figure 4:
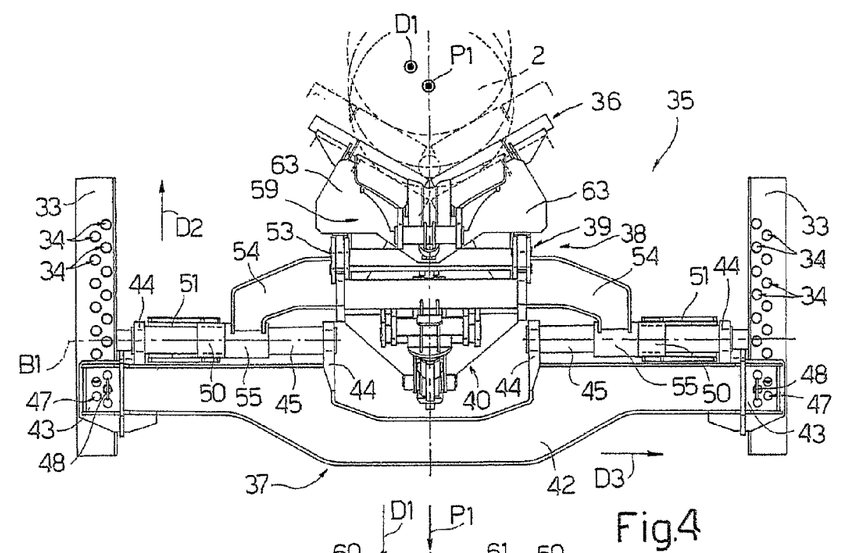
FIG. 4 shows a front view, with parts removed for clarity, of the FIGS. 2 and 3 guide device.

With reference to FIG. 2, frame 39 comprises a rigid rectangular structure 53; two arms 54 integral with rigid structure 53, as shown more clearly in FIG. 4; and two bushes 55, each integral with the end of an arm 54 and connected to a respective shaft 45 to slide along axis B1 and rotate about axis B1.

With reference to FIGS. 2 and 3, cradle 36 comprises a V-shaped structure 56 defined between two end plates 57; two sets of rollers 58 supported by V-shaped structure 56 to form a V-shaped seat for pipeline 2 (FIG. 4); and two cable guide pulleys 59, each fitted to cradle 36 by an articulating mechanism 60 (FIG. 2) to move cable guide pulley 59 selectively between a work position (FIGS. 8, 9) and a rest position (FIG. 4). In the FIG. 8-10 example, each articulating mechanism 60 comprises an arm 61 hinged to one of end plates 57 and supporting cable guide pulley 59; and an actuator 62—in the example shown, a double-acting hydraulic cylinder—hinged to end plate 57 and arm 61.

With reference to FIG. 2, arm 61 supports two projections 63 located on opposite sides of cable guide pulley 59 to guide a cable C (FIG. 9) onto rollers 58.

Cable C is connected to a winch (not shown) and is used in emergency situations making it necessary to abandon pipeline 2 on the sea bed because of bad weather. In which case, the end of pipeline 2 is connected to cable C which is guided by cable guide pulleys 59, which perform the same function to retrieve pipeline 2 from the sea bed when sea conditions allow laying work to continue. When cable guide pulleys 59 are in the work position, cable C is kept clear of, and so prevented from becoming entangled with, rollers 58. Subsequently, cable guide pulleys 59 are lowered below rollers 58 to avoid interfering with pipeline 2, as shown in FIG. 4.

Figure 8:
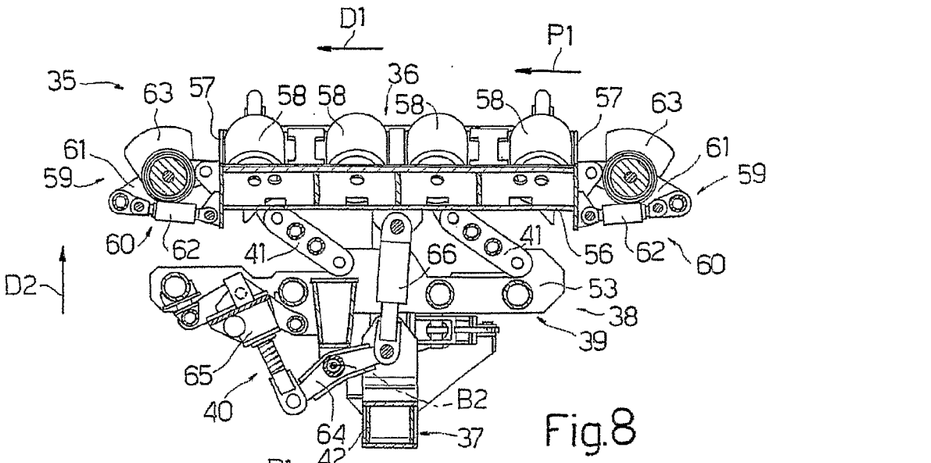
FIGS. 8 and 9 show partly sectioned side views, with parts removed for clarity, of the FIG. 2 guide device in different work positions.
Figure 9:
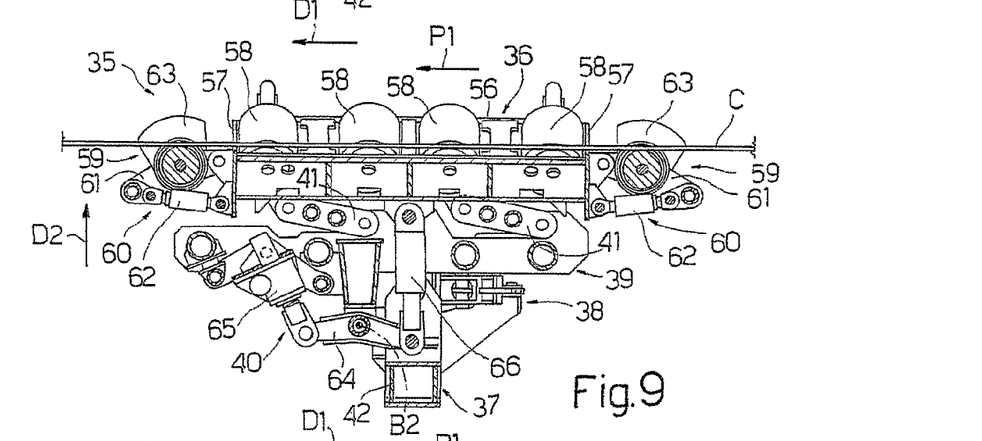

With reference to FIGS. 8 and 9, actuator assembly 40 is connected to frame 39 and cradle 36, and comprises a rocker arm 64 hinged to rigid structure 53 of frame 39 about an axis B2 parallel to axis B1; an actuator 65—in the example shown, a screw-nut screw assembly and electric step motor—hinged to one end of rocker arm 64 and to frame 39; and a shock absorber 66 hinged at one end to cradle 36, and at the other end to the end of rocker arm 64 opposite the end to which actuator 65 is hinged. In the example shown, shock absorber 66 is a double-acting hydraulic cylinder, so the stiffness of shock absorber 66 can be adjusted as a function of the pressure in the double-acting hydraulic cylinder.

Figure 10:
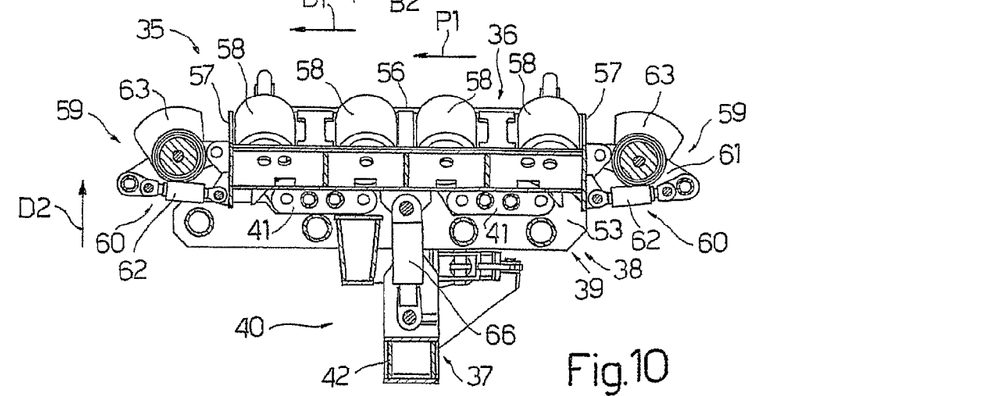
FIG. 10 shows a partly sectioned side view, with parts removed for clarity, of a variation of the FIG. 2 guide device.

In the FIG. 10 variation, rocker arm 64 and actuator 65 are eliminated, and shock absorber 66 is connected directly to cradle 36 and frame 39, so the double-acting hydraulic cylinder defining shock absorber 66 serves to selectively adjust the distance between cradle 36 and frame 39, and to absorb shock from cradle 36.

Guide device 35 is therefore capable of performing the following movements:
- roughly adjusting the distance between cradle 36 and laying ramp 6 by selectively fastening cross beam 42 along uprights 33;
- accurately adjusting the distance between cradle 36 and frame 37 by means of actuator assembly 40;
- rocking cradle 36 freely about axis B1;
- moving cradle 36 freely with respect to laying ramp 6 and parallel to axis B1 in the event of external stress, and positioning the cradle centrally once the stress producing lateral movement of the cradle is removed;
- selectively moving cable guide pulleys 59 between a work position and a rest position.

The movements of cradle 36 and cable guide pulleys 59 are controlled from a remote station, in particular a control device 67 on board the FIG. 1 vessel.

The guide device 35 described with reference to the accompanying drawings is a preferred embodiment of the present invention, to which changes may be made, such as employing only one shaft 45, and only one actuator assembly 46 with two bushes 50 to damp lateral movement of cradle 36 on both sides.

Also, actuator 52 of actuator assembly 46 may be replaced by a spring or a number of springs.

The Control Device

With reference to FIG. 1, vessel 1 is equipped with a control device 67 comprising a control unit 68; a console 69; a hydraulic central control unit 70; sensors 71 and 72 for determining the configuration of laying ramp 6; sensors 73, each for determining the loads transmitted between pipeline 2 and guide device 35 in direction D2; sensors 74 for determining the distance between cradle 36 and frame 39 in direction D2; and sensors 75 for determining stress on pipeline 2 along firing line 5.

Sensors 71, 72, 73, 74, 75 are shown schematically in FIG. 1. More specifically, sensors 71 and 72 are proximity sensors equally spaced along rails 19 and along rails 22, 23, 24 respectively, to determine the position of respective carriages 20 and 25 and calculate the configuration of laying ramp 6 accordingly.

Only two sensors 73 and 74 are shown for the sake of simplicity, it being understood, however, that each guide device 35 is equipped with at least one sensor 73 and at least one sensor 74. Sensors 73 are conveniently load cells located along each guide device 35, and sensors 74 are conveniently linear sensors or encoders located to determine the distance between cradle 36 and frame 39.

Sensor 75 serves to determine stress on pipeline 2. More specifically, sensor 75 is connected to a tensioning device 76 in turn fixed to vessel 1, and which grabs pipeline 2 releasably to tension and brake supply of pipeline 2 to laying ramp 6 in known manner.

Figure 11:
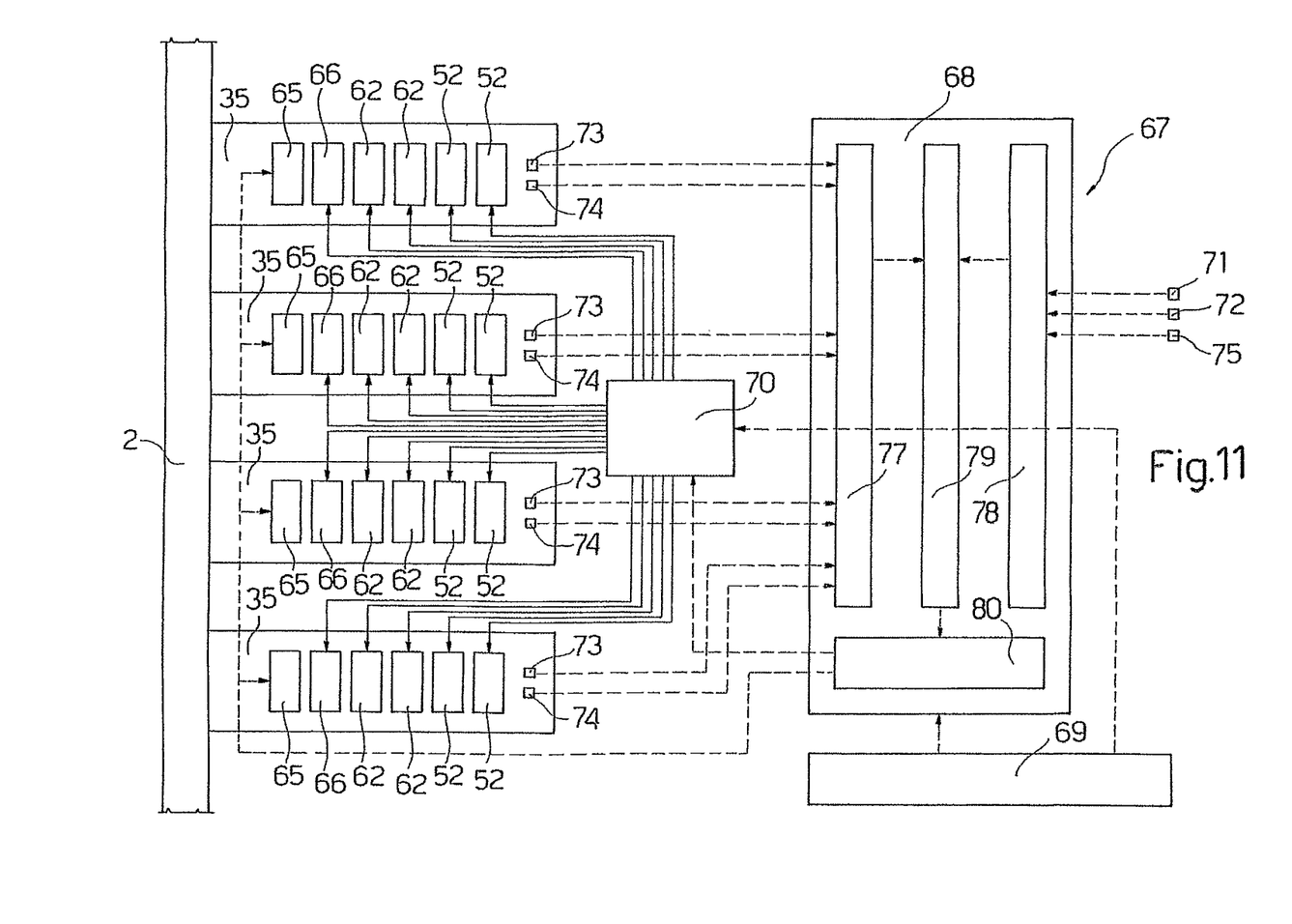
FIG. 11 shows a schematic view, with parts removed for clarity, of a control device of the FIG. 1 laying vessel.

With reference to FIG. 11, control device 67 is connected to four guide devices 35. It should be borne in mind, however, that guide devices 35 are limited to four in FIG. 11 purely for the sake of simplicity, it being understood that control device 67 is connected to all the guide devices 35 equipping the FIG. 1 laying ramp 6, and that no technical or structural limitations exist.

In the example configuration in FIG. 11, control unit 68 comprises an acquisition module 77, which forms a matrix of signals related to the loads and positions emitted respectively by sensors 73 and 74 of guide devices 35; an acquisition module 78, which acquires the signals related to the configuration of laying ramp 6 (FIG. 1) and to the stress on pipeline 2, and forms a matrix of optimum loads and optimum positions respectively of guide devices 35; a subtraction module 79, which performs a subtraction between the matrix of signals related to the recorded loads and positions, and the matrix of optimum loads and positions; and a calculation module 80, which calculates a matrix of error signals to control actuators 65.

Hydraulic central control unit 70 comprises a pump (not shown); and a distributor (not shown) for distributing pressurized fluid selectively to actuators 52, 62 and 66 of each guide device 35.

Console 69 serves to display the signals emitted by sensors 71, 72, 73, 74, 75; select operating modes; and manually enter laying ramp 6 setting values.

The position data of each guide device 35 with respect to respective uprights 33 is entered manually on console 69, which generates signals related to the data entries and acquired by acquisition module 78 to calculate the optimum load and position matrix.

The operating modes performable from console 69 are roughly the following:
- data entry relative to the position of guide devices 35 with respect to laying ramp uprights 33 (FIG. 1);
- laying with automatic positioning of cradles 36 of guide devices 35 on the basis of acquired load and position signals;
- stiffness adjustment of actuators 52 and 66;
- manual operation of actuators 65 to define the position of each cradle 36 along axis D2 and the curvature configuration of pipeline 2 at laying ramp 6;
- emergency mode, which comprises raising cable guide pulleys 59 from the rest position to the work position (actuators 62);
- retrieval mode, which comprises lowering cable guide pulleys 59 from the work position to the rest position (actuators 62).

The optimum load and position matrix, i.e. the ideal load distribution on guide devices 35, can be determined on the basis of the following general principles:
- path P1 of pipeline 2 must not exceed permissible curvature limits;
- the loads transmitted between pipeline 2 and guide devices 35 must be distributed substantially uniformly, i.e. no overloaded or underloaded guide devices 35;
- any shock must be dissipated.

The present invention describes a preferred embodiment, in which control is performed as a function of signals related to load exchange between pipeline 2 and guide devices 35, and signals related to the positions of guide devices 35 with reference to optimum load and position values; it being understood, however, that control may also be performed in other ways, by controlling the position of guide devices 35 solely as a function of load-related signals and optimum load values, and solely as a function of position-related signals and optimum position values.

In addition to the above, in the alternative configuration in FIG. 10, the position of cradles 36 is determined solely by controlling actuators 66.

ADVANTAGES

The present invention has numerous advantages. In particular, each guide device 35 is highly versatile, and, besides adjusting the distance between cradle 36 and frame 37, also allows lateral movement of cradle 36 with respect to laying ramp 6, thus also absorbing lateral shock. Each shock absorber 66 is a hydraulic actuator which absorbs shock in direction D2, while at the same time enabling stiffness adjustment of shock absorber 66. In the FIG. 10 variation, shock absorber 66 also serves to adjust the position of cradle 36.

Moreover, in addition to enabling various movements and adjustments, guide device 35 is highly compact and easy to control both manually and automatically from a remote station on board laying vessel 1.

Moreover, control device 67 provides for optimizing load transmission between the pipeline and guide device 35 automatically, and for minimizing stress in pipeline 2 as it is being laid.

What is claimed is:

1. A guide device for supporting an underwater pipeline along a feed path as it is being laid, with the guide device fitted to a laying ramp, and comprising a cradle housing the pipeline; a first frame fixed to the laying ramp; and a spacer mechanism located between the first frame and the cradle to selectively adjust the distance between the cradle and the first frame; wherein the spacer mechanism comprises at least one shock absorber connected to the cradle, a second frame connected in a rotary manner to the first frame to enable rotation of the second frame about a first axis crosswise to the feed path, a rocker arm connected in rotary manner to the second frame to enable rotation of the second frame about a second axis parallel to the first axis; and a first actuator hinged to the rocker arm and to the second frame; wherein the cradle is hinged to the second frame by connecting rods to form an articulated quadrilateral with the second frame and the connecting rods, with the shock absorber being hinged to the rocker arm and to the cradle.

2. The device of claim 1, wherein the shock absorber is a hydraulic actuator of variable stiffness.

3. The device of claim 1, wherein the first frame comprises at least a first shaft aligned with the first axis; the second frame comprising at least a first bush fitted to rotate about the first shaft and to slide along the first shaft, so as to simultaneously enable the cradle to swing about the first axis and slide along the first axis.

4. The device of claim 3, further comprising at least one actuator assembly extending between the first frame and the spacer mechanism to position the cradle centrally along the first axis with respect to the first frame.

5. The device of claim 3, further comprising two actuator assemblies located on opposite sides of the second frame; each actuator assembly extending between the first frame and the second frame to center the second frame with respect to the first frame along the first axis.

6. The device of claim 5, wherein each actuator assembly comprises a second bush movable along the first shaft; and a second actuator to push the second bush along the first shaft against the first bush.

7. The device of claim 6, wherein each actuator assembly comprises an arm hinged to the first frame and to the second bush; the first actuator being hinged to the first frame and to the arm.

8. The device of claim 1, further comprising two cable guide pulleys connected to two opposite faces of the cradle along the feed path; each cable guide pulley being fitted to the cradle by an articulating mechanism comprising a third actuator for moving the cable guide pulley selectively between a work position and a rest position.

9. An underwater-pipeline laying ramp which is hinged to a laying vessel so as to assume a number of work configurations, and comprising a supporting structure along which are aligned guide devices as claimed in claim 1; with the laying ramp comprising a number of uprights arranged in pairs of opposite uprights and the first frame of each guide device being connected to the opposite uprights in a respective pair.

10. The laying ramp of claim 9, wherein the first frame is connected in sliding manner to the respective pair of uprights and the first frame is fixable in a number of given positions along the respective uprights.

11. The laying ramp of claim 10, wherein the first frame is fixable to the respective uprights by fastening means engaging holes in the first frame and in the uprights.

12. An underwater-pipeline laying vessel comprising:
a firing line for constructing underwater pipelines;
an underwater-pipeline laying ramp as claimed in claim 9; and
a laying ramp actuating assembly for setting the laying ramp to a number of work configurations; with the laying vessel comprising a control device for controlling the distance between each cradle and the respective first frame as a function of a matrix of optimum values.

13. The laying vessel of claim 12, wherein the control device comprises a control unit; a hydraulic central control unit; and first sensors for emitting first signals related to the loads transmitted to each guide device by the pipeline; with the control device correcting the distance between each cradle and the respective first frame as a function of the recorded loads, and a matrix of optimum load distribution between the guide devices.

14. The laying vessel of claim 13, wherein the control device comprises second sensors for emitting second signals related to the positions of the cradles with respect to the respective first frames; the control device correcting the distance between each cradle and the respective first frame as a function of the second signals and a matrix of optimum relative position values of the cradles and the respective first frames.

15. The laying vessel of claim 14, wherein the control device comprises third sensors for emitting third signals related to the work configurations of the laying ramp.

16. The laying vessel of claim 15, further comprising a tensioning device for tensioning the pipeline; with the control device comprising fourth sensors for emitting fourth signals related to the stress transmitted from the pipeline to the tensioning device.

17. The laying vessel of claim 16, wherein the control device comprises a console connected to the control unit and for entering data relative to the positions of the guide devices with respect to the laying ramp, and emitting fifth signals related to the entered data; displaying the first, second, third and fourth signals; and manually controlling the guide devices.

18. The laying vessel of claim 17, wherein the control unit comprises a first acquisition module which acquires the first and second signals to form a first matrix related to the recorded loads; a second acquisition module which acquires the third, fourth and fifth signals to form a second matrix of optimum loads; a subtraction module which calculates the difference between the first and second matrix; and a calculation module which calculates an error signal matrix as a function of the difference between the first and second matrix, and corrects the position of the cradle of each guide device with respect to the respective first frame.

19. A method of controlling a laying ramp for feeding an underwater pipeline along a feed path, the laying ramp being hinged to a laying vessel to assume a number of work configurations, and comprising a supporting structure along which are aligned guide devices, each comprising a first frame fixed to the laying ramp, a cradle housing the pipeline, the cradle being slidably and rotatably connected to the supporting structure to enable sliding of the cradle in a direction crosswise to the feed path and rotation of the cradle about an axis crosswise to the feed path, a spacer mechanism, located between the first frame and the cradle and including at least one shock absorber and a first actuator, and sensors to determine the respective positions of components of the laying vessel or pipeline;
the method comprising:
acquiring signals from the sensors, and remotely controlling the first actuator and the shock absorber for selectively adjusting, for each guide device, the distance and stiffness between the cradle and the respective first frame as a function of a matrix of optimum values, wherein such control is performed as a function of signals received from the sensors.

20. The method of claim 19, which further comprises adjusting the position of each guide device along uprights fixed to the supporting structure of the laying ramp, the uprights extending perpendicular to the laying ramp and having a length greater than the height of the first frame.

21. The method of claim 19, which further comprises acquiring first signals related to the loads transmitted between each guide device and the pipeline; and adjusting the distance between each cradle and the respective first frame as a function of the first signals and a matrix of optimum load values.

22. The method of claim 21, which further comprises acquiring signals related to the relative positions of the cradles and respective first frames; and adjusting the distance between each cradle and the respective first frame as a function of the second signals and a matrix of optimum relative position values of the cradles and respective first frames.

23. The method of claim 22, which further comprises acquiring third signals related to the work configurations of the laying ramp.

24. The method of claim 23, which further comprises acquiring fourth signals related to the stress transmitted between the pipeline and a tensioning device for tensioning the pipeline.

25. The method of claim 24, which further comprises acquiring fifth signals related to the relative positions of the guide devices and the laying ramp.

26. The method of claim 25, which further comprises forming a first matrix of first and second signals related to the recorded loads and recorded relative positions, and a second matrix of optimum loads and optimum positions as a function of the third, fourth and fifth signals; calculating the difference between the first and second matrix; and calculating an error signal matrix as a function of the difference between the first and second matrix, to correct the position of the cradle of each guide device with respect to the respective first frame.

27. The method of claim 26, which further comprises forming a first matrix of first or second signals related to the recorded loads or recorded relative positions, and a second matrix of optimum loads or optimum positions as a function of the third, fourth and fifth signals; calculating the difference between the first and second matrix; and calculating an error signal matrix as a function of the difference between the first and second matrix, to correct the position of the cradle of each guide device with respect to the respective first frame.

28. An underwater-pipeline laying vessel comprising:
an underwater-pipeline laying ramp which is hinged to a laying vessel so as to assume a number of work configurations, and comprising a supporting structure along which are aligned guide devices; with the laying ramp comprising a number of uprights arranged in pairs of opposite uprights and the first frame of each guide device being connected to the opposite uprights in a respective pair; and a laying ramp actuating assembly for setting the laying ramp to a number of work configurations; with the laying vessel comprising a control device for controlling the distance between each cradle and a respective first frame as a function of a matrix of optimum values,
wherein each guide device includes:
a cradle housing the pipeline;
a spacer mechanism located between the first frame and the cradle and comprising:
at least one shock absorber connected to the cradle;
a second frame connected in a rotary manner to the first frame to enable rotation of the second frame about a first axis crosswise to the feed path;
a rocker arm connected in rotary manner to the second frame to enable rotation of the second frame about a second axis parallel to the first axis; and
a first actuator hinged to the rocker arm and to the second frame, with the shock absorber being hinged to the rocker arm and to the cradle;
wherein the control device is configured for remotely controlling the first actuator and the shock absorber for selectively adjusting, for each guide device, the distance and the stiffness between the cradle and the respective first frame.

* * * * *

UNITED STATES PATENT AND TRADEMARK OFFICE
CERTIFICATE OF CORRECTION

PATENT NO.        : 8,734,054 B2
APPLICATION NO.   : 12/866342
DATED             : May 27, 2014
INVENTOR(S)       : Bruschi et al.

It is certified that error appears in the above-identified patent and that said Letters Patent is hereby corrected as shown below:

In the Specification

Column 3:
Line 32, before "ramp", change "laving" to -- laying --.
Line 33, change "uprights" to -- uprights, --.

Signed and Sealed this
Fifth Day of August, 2014

Michelle K. Lee
*Deputy Director of the United States Patent and Trademark Office*